(12) United States Patent
Vernaza et al.

(10) Patent No.: US 11,189,171 B2
(45) Date of Patent: Nov. 30, 2021

(54) TRAFFIC PREDICTION WITH REPARAMETERIZED PUSHFORWARD POLICY FOR AUTONOMOUS VEHICLES

(71) Applicant: NEC Laboratories America, Inc., Princeton, NJ (US)

(72) Inventors: Paul Vernaza, Sunnyvale, CA (US); Nicholas Rhinehart, Pittsburgh, PA (US)

(73) Assignee: NEC Corporation

( * ) Notice: Subject to any disclaimer, the term of this patent is extended or adjusted under 35 U.S.C. 154(b) by 341 days.

(21) Appl. No.: 16/266,713

(22) Filed: Feb. 4, 2019

(65) Prior Publication Data

US 2019/0287404 A1 Sep. 19, 2019

Related U.S. Application Data

(60) Provisional application No. 62/642,168, filed on Mar. 13, 2018.

(51) Int. Cl.
*G08G 1/16* (2006.01)
*G08G 1/01* (2006.01)
(Continued)

(52) U.S. Cl.
CPC ............... *G08G 1/164* (2013.01); *G06N 3/08* (2013.01); *G06N 5/046* (2013.01); *G06N 7/005* (2013.01);
(Continued)

(58) Field of Classification Search
CPC ...................................................... G08G 1/164
See application file for complete search history.

(56) References Cited

U.S. PATENT DOCUMENTS 10,373,054 B2 * 8/2019 Goel .................... G06N 3/0454
10,421,453 B1 * 9/2019 Ferguson .......... B60W 60/0027
(Continued)

FOREIGN PATENT DOCUMENTS

EP 3591584 A1 * 1/2020 ........... G06N 3/0454

OTHER PUBLICATIONS

NPL, Shakir, The Spectator, Machine Learning Blog, Machine Learning Trick of the Day (4): Reparameterisation Tricks ( http://blog.shakirm.com/2015/10/machine-learning-trick-of-the-day-4-reparameterisation-tricks/)(Oct. 29, 2015).*
(Continued)

*Primary Examiner* — Jean Paul Cass
(74) *Attorney, Agent, or Firm* — Joseph Kolodka

(57) ABSTRACT

Systems and methods for vehicle behavior prediction include an imaging device that captures images of a vehicle in traffic. A processing device including policy stored in a memory of the processing device in communication with the imaging device stochastically models future behavior of the vehicle based on the captured images. A policy simulator in communication with the processing device simulates the policy as a reparameterized pushforward policy of a base distribution. An evaluator receives the simulated policy from the policy simulator and performs cross-entropy optimization on the future behavior of the vehicle by analyzing the simulated policy and updating the policy according to cross-entropy error. An alert system retrieves the future behavior of the vehicle and recognizes hazardous trajectories of the future trajectories and generates an audible alert using a speaker.

20 Claims, 8 Drawing Sheets

(51) Int. Cl.
*G06N 7/00* (2006.01)
*G06N 3/08* (2006.01)
*G06N 20/00* (2019.01)
*G06N 5/04* (2006.01)

(52) U.S. Cl.
CPC ........... *G06N 20/00* (2019.01); *G08G 1/0129* (2013.01); *G08G 1/0145* (2013.01)

(56) References Cited

U.S. PATENT DOCUMENTS

| | | | | |
|---|---|---|---|---|
| 10,884,430 | B2* | 1/2021 | Kumar | G05D 1/0289 |
| 2010/0073199 | A1* | 3/2010 | Christophe | G01C 23/00 340/963 |
| 2011/0133927 | A1* | 6/2011 | Humphrey | A62B 99/00 340/539.11 |
| 2019/0087965 | A1* | 3/2019 | Datta | A61B 5/1116 |
| 2019/0095731 | A1* | 3/2019 | Vernaza | G06K 9/00624 |
| 2020/0187790 | A1* | 6/2020 | Milner | A61B 5/02007 |

OTHER PUBLICATIONS

NPL, Diederik P. Kingma, Auto-Encoding Variational Bayes, (https://arxiv.org/pdf/1312.6114.pdf)(May 2014)(hereinafter"Kingma").*

Shayer, Oran, et al., Learning Discrete Weights Using the Local Reparameterization Trick, Cornell University, (https://arxiv.org/abs/1710.07739)(Feb. 2, 2018)(hereinafter "Shayer").*

Berlatii, Alessandro, Ambiguity in Sequential Data: Predicting Uncertain Futures With Recurrent Models, IEEE, https://ieeexplore.IEEE.org/abstract/document/9001185 (2020).*

Deep Imitative Models for Flexible Inference, Planning, and Control, Submitted to 32nd Conference on Neural Information Processing Systems (NIPS 2018).*

Rhinehart, R2P2: A ReparameteRized Pushforward Policy for Diverse, Precise Generative Path Forecasting, Carnegie Mellon University, Pittsburgh PA 15213, USA (2018).*

Ratliff, "Maximum Margin Planning", Proceedings of the 23rd International Conference on Machine Learning, Jun. 2006, pp. 729-736.

Ziebart, "The Principle of Maximum Causal Entropy for Estimating Interacting Processes", IEEE Transactions on Information Theory, Feb. 2013, pp. 1966-1980.

Levine, "Continuous Inverse Optimal Control with Locally Optimal Examples", Proceedings of the 29th International Conference on Machine Learning, Jun. 2012, pp. 475-482.

Lee, "Desire: Distant Future Prediction in Dynamic Scenes with Interacting Agents", 2017 IEEE Conference on Computer Vision and Pattern Recognition, Jul. 2017, 10 pages.

* cited by examiner

TRAFFIC PREDICTION WITH REPARAMETERIZED PUSHFORWARD POLICY FOR AUTONOMOUS VEHICLES

RELATED APPLICATION INFORMATION

This application claims priority to U.S. Provisional Application 62/642,168, filed on Mar. 13, 2018, incorporated herein by reference herein its entirety.

BACKGROUND

Technical Field

The present invention relates to traffic prediction and more particularly traffic path prediction with a reparameterized pushforward policy for autonomous vehicles.

Description of the Related Art

Autonomous vehicles can be improved by improving behavior prediction of surrounding traffic, such as, e.g., path prediction of nearby vehicles. Using better predictions, an autonomous vehicle can better avoid dangerous situations involving other vehicles, or warn an operator of impending hazards. Therefore, behavior prediction based on visual information benefits from predicting not just one possible future, but all possible futures to facilitate a comprehensive understanding of possible hazards and traffic environments.

However, predicting all possible futures is a high dimensional problem because each future possibility is a high-dimensional object with many degrees of freedom. Depending on how the prediction model is trained, the model may be overfit to training data, thus reducing density. However, correcting for density deficiencies can lead to imprecise modeling.

SUMMARY

According to an aspect of the present invention, a system for vehicle behavior prediction is described. The system includes an imaging device that captures images of a vehicle in traffic. A processing device including policy stored in a memory of the processing device in communication with the imaging device stochastically models future behavior of the vehicle based on the captured images. A policy simulator in communication with the processing device simulates the policy as a reparameterized pushforward policy of a base distribution. An evaluator receives the simulated policy from the policy simulator and performs cross-entropy optimization on the future behavior of the vehicle by analyzing the simulated policy and updating the policy according to cross-entropy error. An alert system retrieves the future behavior of the vehicle and recognizes hazardous trajectories of the future trajectories and generates an audible alert using a speaker.

According to another aspect of the present invention, a system is provided for vehicle behavior prediction. The system includes an imaging device that captures images of a vehicle in traffic. A processing device including policy stored in a memory of the processing device in communication with the imaging device stochastically models future behavior of the vehicle based on the captured images. A policy simulator in communication with the processing device simulates the policy as a reparameterized pushforward of a base distribution, including a policy model that simulates the policy as an autoregressive map of random noise sequences in terms of deterministic drift and stochastic diffusion. A density estimator estimates a ground-truth probability for evaluating the future behavior. An evaluator in communication with the policy simulator and the density estimator performs cross-entropy optimization on the future behavior of the vehicle by analyzing the simulated policy and the ground-truth probability according to density of a probability distribution and precision of predicted probabilities corresponding to the future behavior, and updating the policy according to cross-entropy error. An alert system recognizes hazardous trajectories of the probable future trajectories and generates and audible alert using a speaker.

According to another aspect of the present invention, a method is provided for vehicle behavior prediction. The method includes capturing images of a vehicle in traffic an imaging device. A policy stored in memory stochastically models future behavior of the vehicle based on the captured images. A policy simulator simulates the policy as a reparameterized pushforward of a base distribution. An evaluator performs cross-entropy optimization on the future behavior of the vehicle by analyzing the simulated policy and updating the policy according to cross-entropy error using an evaluator. An alert system recognizes hazardous trajectories of the probable future trajectories and generates and audible alert using a speaker.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
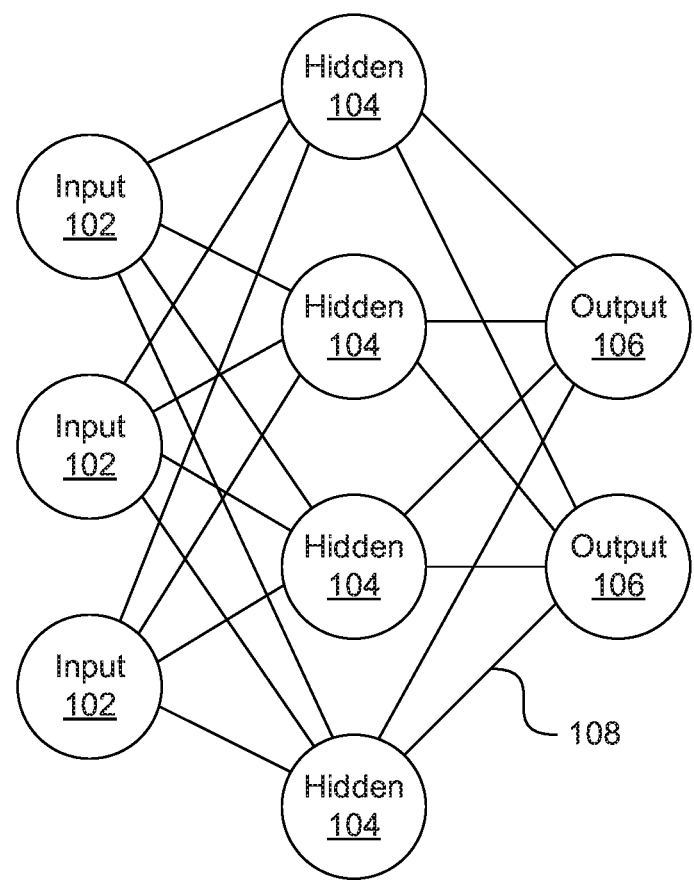
FIG. 1 is a generalized diagram of a neural network, in accordance with the present invention.

In accordance with the present invention, systems and methods are provided for traffic behavior prediction for autonomous driving using a reparameterized pushforward policy.

In one embodiment, a learning-based system implements a policy to model future behavior, such as, e.g., possible paths of travel, of other vehicles in traffic relative to an autonomous vehicle. The policy can be a stochastic policy that predicts a distribution of likely future trajectories. Thus, the policy produces a highly multi-variate and continuous distribution that can be difficult to evaluate.

To train the policy according to historical vehicle behaviors and paths, or by some other training data, the policy is evaluated using an evaluation engine that implements a symmetrized cross-entropy objective that optimizes the policy to balance diversity of the predicted distribution and precision of predicted paths.

To facilitate the evaluation, the evaluation engine remodels the predicted distribution by simulating a policy as a pushforward distribution of a future state and parameterizing the simulation as a sampling a base distribution mapped to the future state. Simulation of the policy entails pushing forward random noise sequences through the map simulating the policy. The resulting "pushforward distribution" can be evaluated for coverage of probable areas of vehicle paths due to the invertibility and differentiability of the pushforward map. The evaluation engine also maintains a separate, approximate probability distribution of ground-truth paths. As a result, each path of the predicted paths can be evaluated for precision by using the approximate probability distribution as a measure of the plausibility of predicted paths.

Thus, precision and density are concurrently evaluated for the policy to train the policy to predict accurate vehicle paths without overfitting. Accordingly, the autonomous vehicle obtains more accurate distributions of traffic behaviors for better decision making to avoid hazardous situations. Moreover, an operator can be warned more effectively and accurately of possible imminent hazardous situations.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
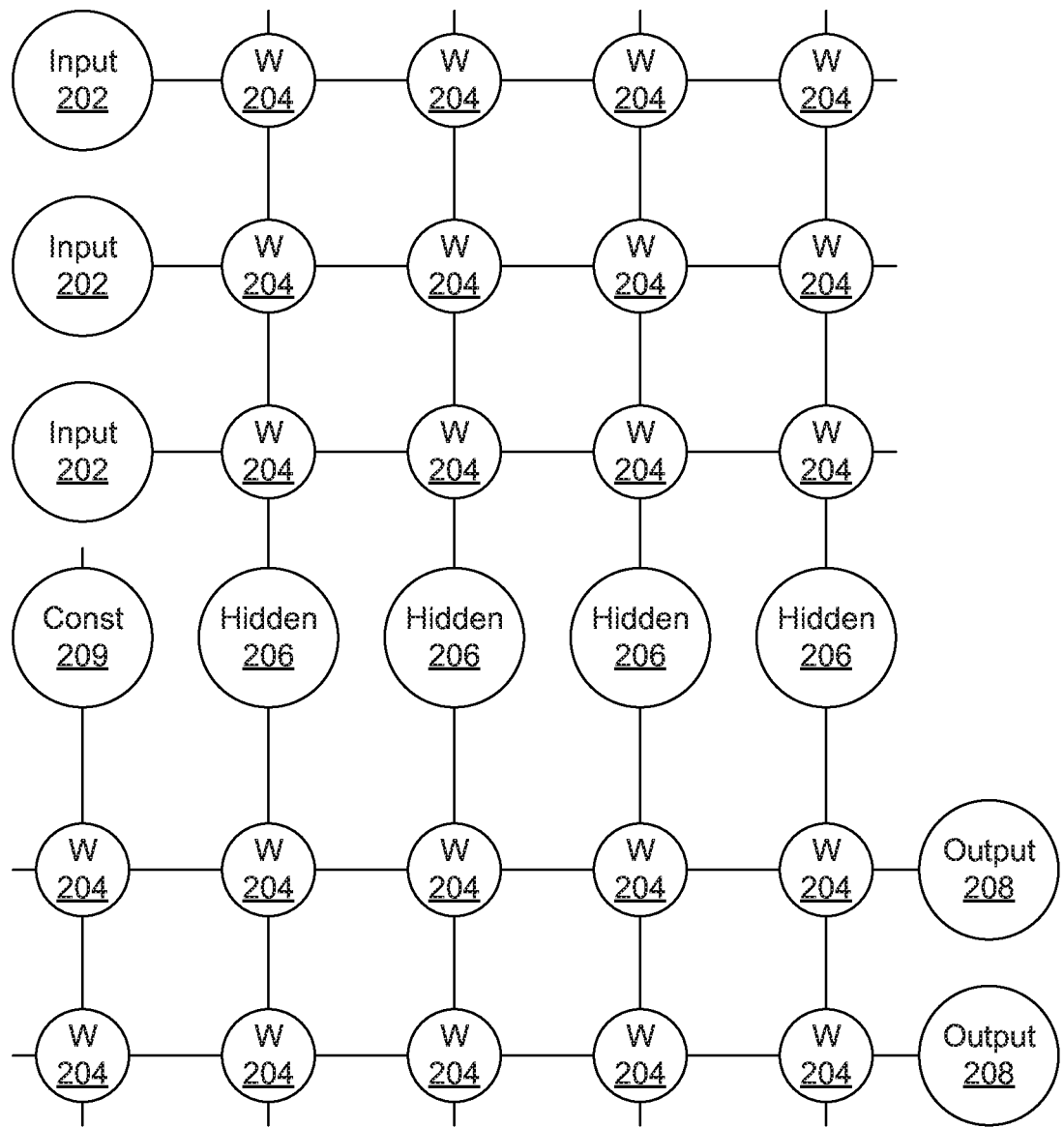
FIG. 2 is a block/flow diagram illustrating an artificial neural network (ANN) architecture, in accordance with the present invention.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

Figure 3:
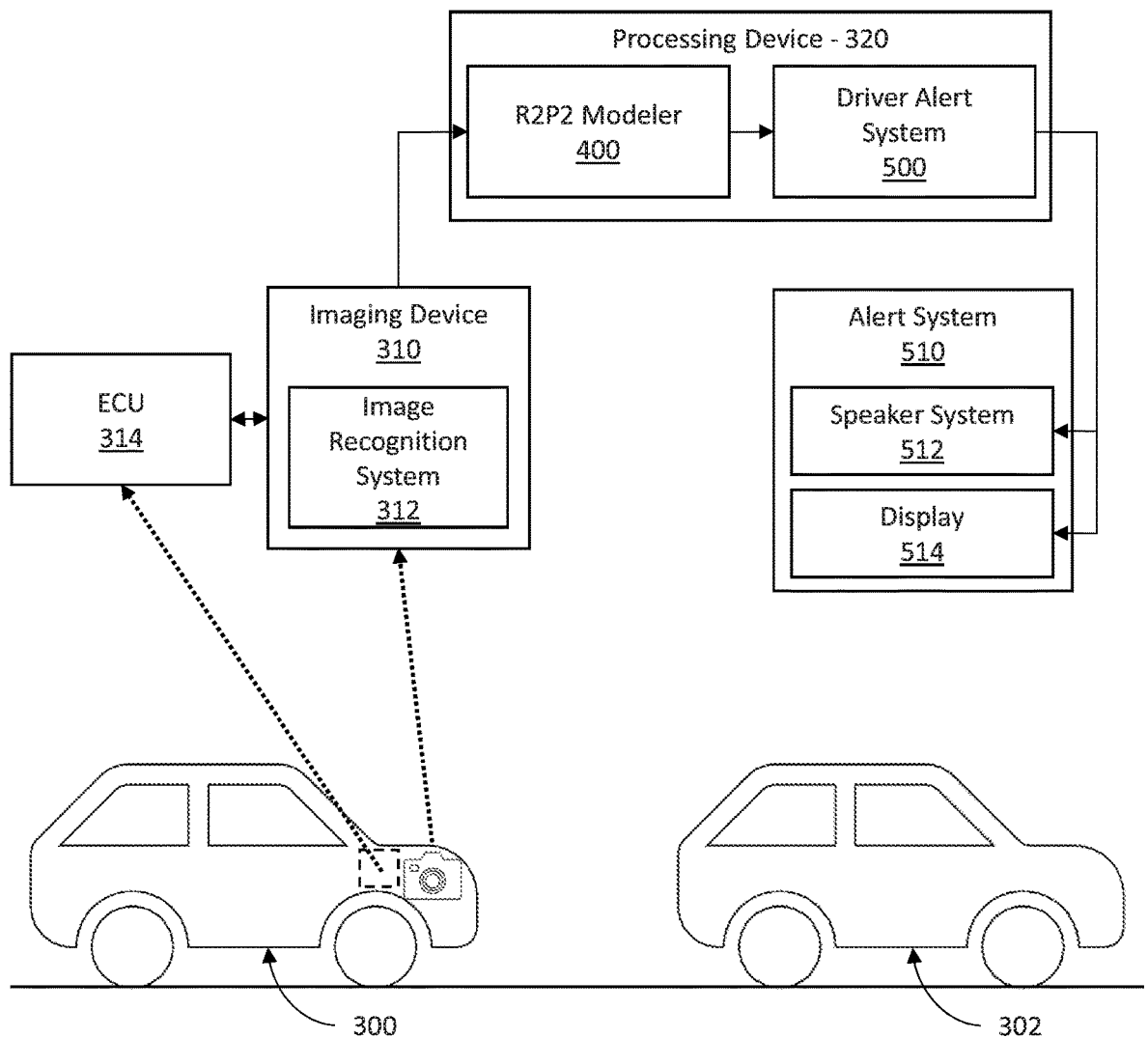
FIG. 3 is a block/flow diagram illustrating a high-level system/method for a vehicle behavior prediction system with driver alerts using a reparameterized pushforward policy, in accordance with the present principles.

Referring now to FIG. 3, a block/flow diagram illustrating a high-level system/method for a vehicle behavior prediction system with driver alerts using a reparameterized pushforward policy is depicted in accordance with the present principles.

In one embodiment, a vehicle 300 includes a system for predicting behavior of a second vehicle 302. The system for predicting behavior includes an imaging device 310 and a processing device 320.

The imaging device 310 can be positioned on or within the vehicle 300 such that the imaging device 310 can capture images of vehicles ahead, such as, e.g., the second vehicle 302. For example, the imaging device 110 can be attached, e.g., to the windshield, behind an opening in the front of the vehicle 300, or in any other suitable location for detecting images ahead. The images detected by the imaging device 310 can include, e.g., visible light images, infrared (IR) images, ultraviolet (UV) images, or any images detected in any other range of the electromagnetic (EM) spectrum. In some possible embodiments, the images could even be based on acoustic signals similar to, e.g., sonar. Thus, the imaging device 310 can include, e.g., a digital image sensor, an IR sensor, a charge coupled device (CCD), an UV sensor, or other image sensing device. The imaging device 310 can generate a series of images objects ahead, such as the second vehicle 302. The series of images can thus provide current behavioral information, such as, e.g., positional information and current trajectory of objects.

However, additional information can be used in conjunction with the images to provide velocity and acceleration information, including changes of direction. For example, information from the electronic control unit (ECU) 314 of the vehicle 300 can communicate with the imaging device 310 to provide information related to position and/or movement of the vehicle 300. Thus, the position and/or movement of the vehicle 300 can be used to augment the relative position from the series of images of the objects ahead, such as, e.g., the second vehicle 302, to determine acceleration and velocity.

Moreover, determining the current behavioral information of a vehicle ahead, such as the second vehicle 302, can include an image recognition system 312 for recognizing the second vehicle 302 as well as environmental features, such as, e.g., intersections, cross streets, curves, turns, lanes, pedestrians, bicyclists, vegetation, and other objects present in a driving environment such as a road. The image recognition system 312 can recognize the objects using, e.g., semantic segmentation with a neural network such as, e.g., a convolutional neural network (CNN), a recurrent neural network (RNN), or other semantic segmentation technique.

To facilitate determining current and future trajectories in relation to the environment, such as, e.g., relative to roads, building, vehicles, and other features including those described above, the image recognition system 312 can also include a component for generating a visual side information, such as, e.g., a bird's eye view or top down view of the vehicle 300 and the surrounding environment. The visual side information can depict the second vehicle 302 in relation to the road ahead and any cross streets or intersections as well as other vehicles and objects in the road. As such, relative locations of the environmental features can be taken into account more efficiently when determining future trajectories of the second vehicle 302.

Thus, the processing device 320 can receive the visual side information into from the imaging device 310 to generate a prediction of future trajectories of the second vehicle 302. The processing device 320 can include, e.g., a computing system such as, e.g., a processor, a memory device, a storage device and other components of a computing device. As a result, the visual side information can be stored in a memory or a storage component of the processing device such that the processing device 320 can implement a reparameterized pushforward policy (R2P2) modeler 400 including with the processing device 320 in, e.g., a memory or storage and executed by a processor. The R2P2 modeler 400 models a distribution of a variety of possible future trajectories through the visual side information of the second vehicle 302.

The R2P2 modeler 400 can implement a stochastic policy on the visual side information to determine a distribution for the most probable future trajectories. For example, embodiments of the present invention can include, e.g., a linear generator, convolutional neural network (CNN) modelling, recurrent neural network (RNN) modelling, and combinations thereof.

Through training, the stochastic policy can be optimized to predict a distribution that is both precise and accurately dense. Therefore, the stochastic policy can be evaluated by, e.g., simulating the policy as a push-forward of a distribution of random noise sequences, and then reparametrizing the resulting distribution as a transformation of a sample form a base distribution that is both invertible and differentiable. Thus, the policy of the R2P2 modeler 400 can be concurrently evaluated against density and precision according to a ground truth path distribution using, e.g., cross-entropy optimization. Such a methodology takes into account the underlying uncertainty of the future behavior of the second vehicle 302, and models potential future trajectories in view of the uncertainty. As a result, the R2P2 modeler 400 can take into account the environment to determine the most likely future trajectory of the second vehicle 302 according to a determination of a representative set of the most desirable trajectories.

The predicted future trajectories can be analyzed and acted upon by a driver alert system 500 included with the processing device 320. While in this embodiment, the driver alert system 500 is included with the processing device 320, such that the processing device 320 can perform operations for analysis of the future trajectories and determines for driver alerts, the driver alert system 500 can alternatively be separate from the processing device 320. For example, the driver alert system 500 can include, e.g., a separate processor, memory and/or storage for receiving and acting upon the future trajectories predicted by the R2P2 modeler 400.

The driver alert system 500 receives the future trajectories and determines a potentially hazardous future behavior of the second vehicle 302. For example, the driver alert system 500 can recognize, e.g., an unsafe lane change, an improper or illegal turn, a collision, or other unsafe behavior. In recognizing the hazardous trajectory, the driver alert system 500 can generate a notification for the driver of the vehicle 300. For example, the driver alert system 500 can generate an audible alert through the vehicle's 300 speaker system 512. Alternatively, the driver alert system 500 can send an alert to a display 514, such as, e.g., a head's up display, a gauge display, an infotainment display, or other display in communication with the driver alert system 500. The displayed alert can include a general alert that does not specify the type of hazardous behavior predicted, or the alert can identify the type of behavior or trajectory through, e.g., a spoken description, a depiction of the behavior on the display, a description on the display, or any other method of depicting the hazardous trajectory.

Figure 4:
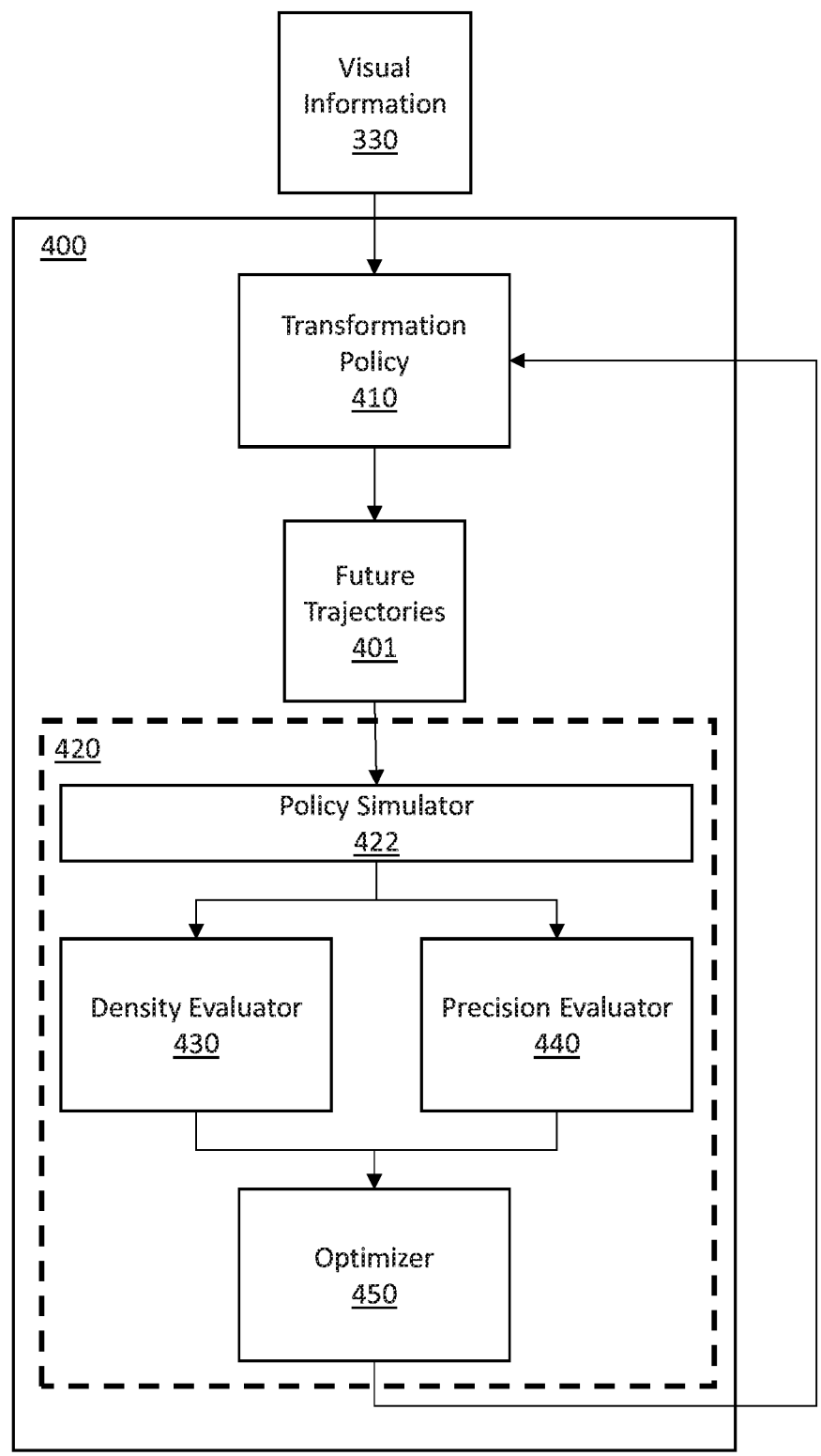
FIG. 4 is a block/flow diagram illustrating a system/method for modelling traffic behavior using a reparameterized pushforward policy, in accordance with the present principles.

Referring now to FIG. 4, a block/flow diagram illustrating a system/method for modelling traffic behavior using a reparameterized pushforward policy is depicted in accordance with the present principles.

According to aspects of the present embodiment, a R2P2 modeler 400, such as, e.g., the R2P2 modeler 400 described above, can employ and train a policy 410 that generates a prediction of future trajectories 401 from visual information 300. The visual information 330 can include, e.g., data from a camera, light detection and ranging (LiDAR) devices, infra-red (IR) sensors, and other imaging devices and combinations thereof. For example, an autonomous vehicle can include the image devices and capture images of vehicle in a traffic environment. The visual information 330 can undergo transformations, such as, e.g., object recognition, warping and perspective transformations, including generating a bird's eye view of the traffic environment, as well as other transformations, and combinations thereof to form contextual and visual side information.

The visual information 330 is retrieved by the policy 410. The policy 410 can include, e.g., a software module stored in a memory or storage device, such as, e.g., a buffer, random access memory (RAM), a storage drive, a flash storage device, or other form of storage, and executed by a processing device. Upon processing, the policy 410 uses the visual information 330 to generate a prediction of future likely traffic behaviors, such as, e.g., paths of travel for other vehicles in traffic. The policy 410 can include, e.g., a stochastic policy to generate probability densities corresponding to the predicted traffic behaviors through the environment. For example, the policy 410 can include, e.g., a linear generator, a convolutional neural network (CNN), a recurrent neural network (RNN), among others and combinations thereof. As a result, future vehicle behaviors of other vehicles in the traffic environment can be anticipated and mitigated where hazardous. For example, a vehicle that is likely to stop quickly can be predicted and brakes can be applied early to avoid a collision.

However, such probability densities resulting from a stochastic policy can be difficult to evaluate, and therefore train due to the continuous and multi-variate nature of the distribution. Accordingly, the future trajectories 401 can be retrieved by a cross-entropy evaluator 420 and re-modeled with a policy simulator 422. Thus, the policy simulator 422 can remodel the policy 410 that gave rise to the future trajectories 401 by simulating the policy as a pushforward of a distribution of random noise sequences. Thus, the policy simulator 422 generates a function $g_\pi( )$ that simulates the stochastic policy 410 ($\pi$) to create the probability densities of the future trajectories 401.

Accordingly, the distribution of probability densities corresponding to the future trajectories 401 can be modeled as a function of roll-outs from a distribution of random noise sequences. For example, the policy simulator 422 can sample the random noise sequences z from a base distribution, where each noise sequence z is rolled-out with the function $g_\pi( )$ to model the future trajectories 401.

The simulated outcome distribution can itself be represented in more efficient form by reparameterizing it as a transformation from a sample of a base distribution to the simulated distribution via the policy simulator 422. As a result, samples from the simulated outcome distribution are represented in both a differentiable and invertible way, lending itself well to, e.g., stochastic gradient descent, upon optimization to generate an updated policy $\pi$. Therefore, the simulated distribution corresponding to the future trajectories 401 generated by the policy simulator 422 can be evaluated for error more easily than the future trajectories 401 themselves.

To evaluate the performance of the policy 410 in predicting the future trajectories 401, the cross-entropy evaluator 420 passes the pushforward policy $g_\pi(z)$ to both a density evaluator 430 and a precision evaluator 440. The cross-entropy evaluator 420 can concurrently evaluate the policy for density and precision to perform a cross-entropy optimization that facilitates policy updates that improve accuracy while preventing overfitting.

The density evaluator 430 evaluates the policy according to $H(p, q_\pi)$, where p is a ground truth or empirical distribution of paths, $q_\pi$ is the probability density of the predicted future trajectories 401, and H is the evaluator function. The evaluation function of the density evaluator 430 analyzes the ground truth distribution p and the distribution $q_\pi$ of future trajectories 401. The evaluator H can be configured to penalize the policy for assigning a low density of paths to a region in the environment having observed ground truth data, thus penalizing π for $q_\pi$ failing to provide density corresponding to the ground truth distribution p.

The precision evaluator 440 evaluates the policy according to $H(q_\pi, p)$. The evaluation function of the precision evaluator 440 analyzes the ground truth distribution p and the distribution $q_\pi$ of future trajectories 401. The evaluator H can be configured to penalize the policy for assigning a high density of paths to a region in the environment having a low density observed in ground truth data. Thus, π is penalized for $q_\pi$ failing to provide distribution precision corresponding to the ground truth distribution p.

The precision evaluator 440 and the density evaluator 430 can operate in parallel to form evaluations for both precision and density, respectively, for the future trajectories 401. An optimizer 450 can balance the precision and the density evaluations using cross-entropy optimization. For example, the optimizer 450 can be a software module stored in a storage or memory device and executed by a processing device to implement cross-entropy in the form of equation 1 below:

$$\min_\pi E_{\phi \sim \Phi} - E_{x \sim p(\cdot|\phi)} \log q_\pi(x|\phi) - \beta E_{x \sim q_\pi}(\cdot|\phi) \log p(x|\phi), \quad \text{Equation 1}$$

where E signifies the expected value, ϕ is a set of features of the environment, Φ is the ground truth feature distribution, x is a sample, and β is a predefined coefficient. However, since p is a ground truth distribution of driver behavior, p may, in practice, be unfeasible to obtain. As a result, p can be substituted with a learned approximation $\hat{p}$ according to prior experience. Moreover, the approximation $\hat{p}$ can be simple and visually interpretable to facilitate evaluation. As a result, equation 1 can be rewritten as equation 2, below:

$$\min_\pi E_{\phi \sim \Phi} - E_{x \sim p(\cdot|\phi)} \log q_\pi(x|\phi) - \beta E_{x \sim q_\pi}(\cdot|\phi) \log \hat{p}(x|\phi), \quad \text{Equation 2}$$

Here, $-E_{x \sim p} \log q_\pi(x)$ approximates the density evaluator $H(p, q_\pi)$ described above, while $-\beta E_{x \sim q_\pi} \log \hat{p}(x)$ approximates the precision evaluator $H(q_\pi, p)$. Thus, samples from the simulated distribution $q_\pi$ can be reparameterized as functions of samples z from the base distribution $q_b$. The reparameterization of the simulated outcome distribution facilitates more efficient evaluation of equation 2. Accordingly, equation 2 can be rewritten as, e.g., equation 3 below:

$$\max_\pi E_{\phi \sim \Phi} E_{x \sim p(\cdot|\phi)} \log q_b(g_\pi^{-1}(x|\phi)) - \\ \log |(dg_\pi)_{g_\pi^{-1}(x|\phi)}| + \beta E_{z \sim q_b(\cdot|\phi)} \log \hat{p}(g_\pi(z|\phi)|\phi), \quad \text{Equation 3}$$

where $q_b$ is a base distribution, z is a random noise sequence, and $$\log |(dg_\pi)_{g_\pi^{-1}(x|\phi)}|$$

is the log of the absolute value of the determinant of the Jacobian of $g_\pi$ evaluated at the point $g_\pi^{-1}(x|\phi)$. Accordingly, equation 3 illustrates how learning and inference can be facilitated by representing the policy 401 as a reparameterized push-forward of a base distribution. Thus, differentiation with respect to π is facilitated and stochastic gradient descent can be employed to update the policy 410 upon optimization by the optimizer 450.

Figure 5:
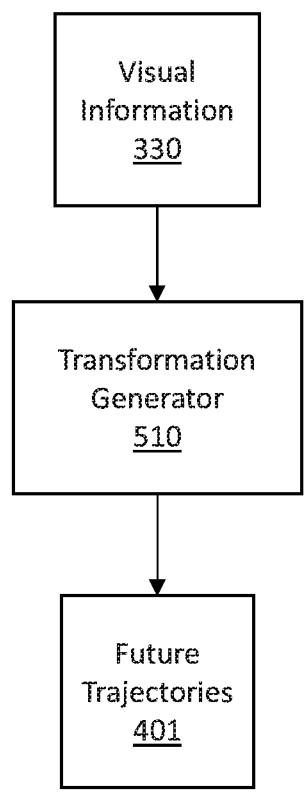
FIG. 5 is a block/flow diagram illustrating a system/method for generating future trajectories of traffic participants for a reparameterized pushforward policy, in accordance with the present principles.

Referring now to FIG. 5, a block/flow diagram illustrating a system/method for generating future trajectories of traffic participants for a reparameterized pushforward policy is depicted in accordance with the present principles.

According to an embodiment of the present invention, visual information 330 can be used to produce a prediction of future trajectories 401 with a policy, including, e.g., a stochastic policy. The policy can include a transformation generator 510. The transformation generator 510 uses previous states from past visual information to learn one or more linear functions, such as, e.g., two linear functions constituting predictions. Thus, the transformation generator 510 iteratively generates a next step in a path distribution from the previous steps. Accordingly, a distribution of future trajectories 401 is iteratively created.

Figure 6:
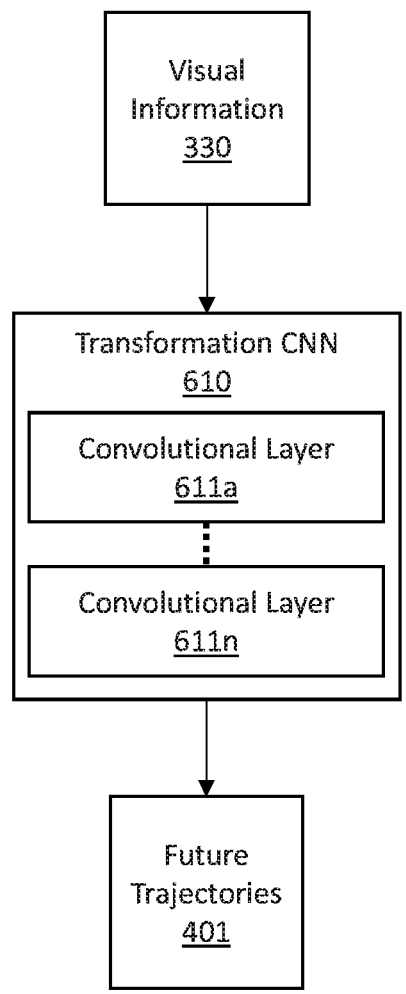
FIG. 6 is a block/flow diagram illustrating a system/method for modelling future trajectories of traffic participants for a reparameterized pushforward policy, in accordance with the present principles.

Referring now to FIG. 6, a block/flow diagram illustrating a system/method for modelling future trajectories of traffic participants for a reparameterized pushforward policy is depicted in accordance with the present principles.

According to an embodiment of the present invention, visual information 330 can be used to produce a prediction of future trajectories 401 with a policy, including, e.g., a stochastic policy. The policy can include a transformation convolutional neural network (CNN) 610.

The transformation CNN 610 retrieves the visual information 330, including, e.g., a bird's eye view map of the traffic environment. Using the bird's eye view map, the transformation CNN 610 reasons with environment perception using one or more convolutional layers 611a-n. Thus, the transformation CNN 610 uses the bird's eye view map as input, broken up in C frames, where C can be any suitable number of frames, such as, e.g., 32. Using the convolutional layers 611a-n, the bird's eye view map is transformed into a features vector with channels for each component of the feature vector, for example, 6 channels, by bilinearly interpolating at the current rollout position in the spatial dimensions corresponding to the environment. To facilitate the prediction of the feature vector, dilated convolutions can be employed. As a result, an environmentally reasoned prediction of a distribution of future trajectories 401 is generated.

Figure 7:
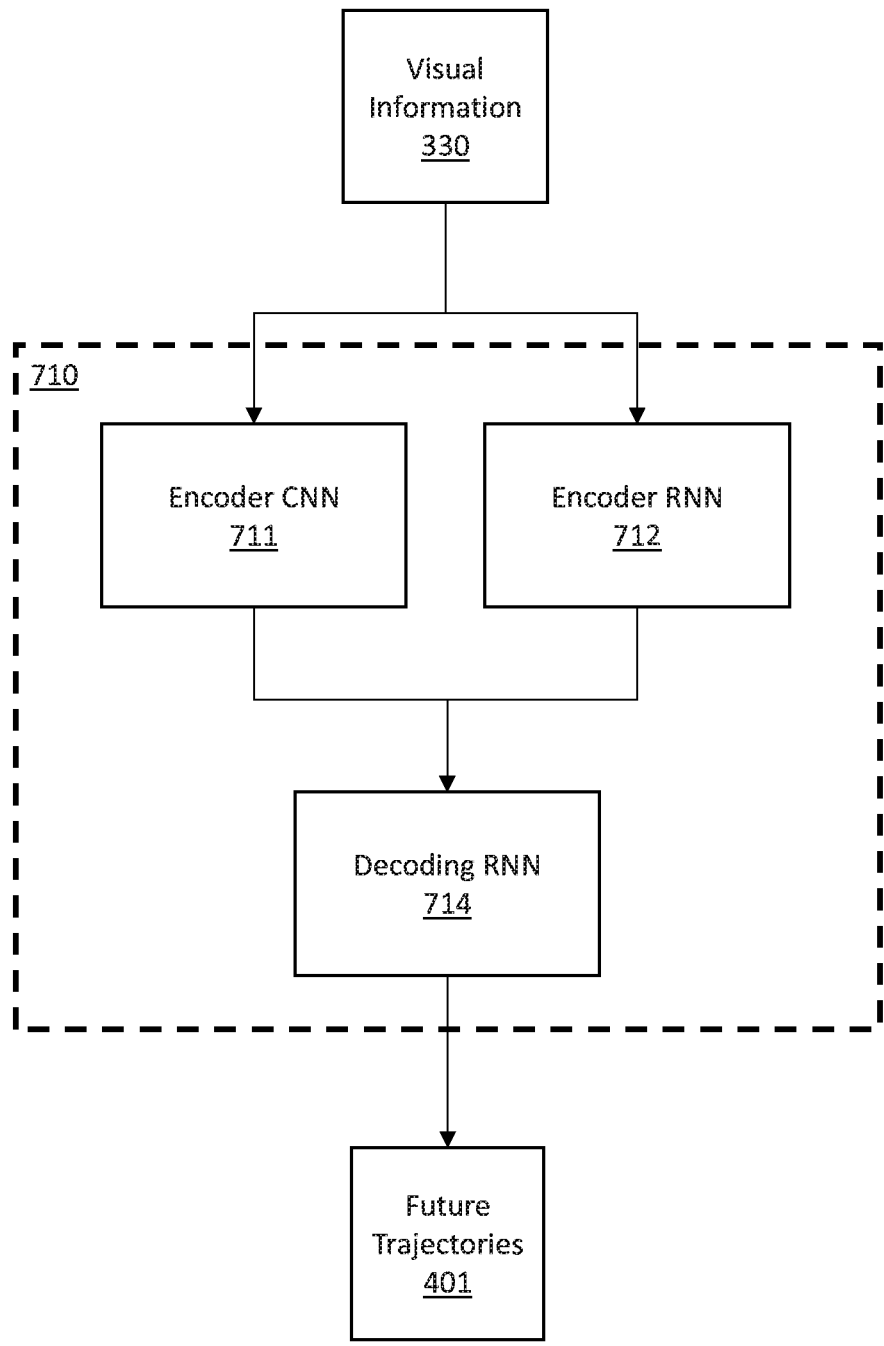
FIG. 7 is a block/flow diagram illustrating a system/method for modelling future trajectories of traffic participants for a reparameterized pushforward policy, in accordance with the present principles.

Referring now to FIG. 7, a block/flow diagram illustrating a system/method for modelling future trajectories of traffic participants for a reparameterized pushforward policy is depicted in accordance with the present principles.

According to an embodiment of the present invention, visual information 330 can be used to produce a prediction of future trajectories 401 with a policy, including, e.g., a stochastic policy. The policy can include a transformation RNN 710 that can include, e.g., a combination of RNNs and CNNs.

In one possible embodiment, the transformation RNN 710 includes an encoder CNN 711 and an encoder RNN 712 for separately encoding the visual information 330. The encoder CNN 711 can utilize a bird's eye view from the visual information 330 to generate a feature vector including path predictions. Meanwhile, the encoder RNN 712 encodes the past states of the traffic environment, for example, by using one or more gated recurrent units (GRU). Thus, similar to the transformation generator 510 described above, the encoder RNN 712 can generate iterative predictions based on past states of the environment to produce historically reasoned predictions.

The predictions from the encoder RNN 712 and the encoder CNN 711 can be combined to form a single feature vector using, e.g., addition or concatenation. The combined feature vector can then be decoded to generate future trajectories 401 using, e.g., a decoding RNN 714 employing GRUs. Thus, the transformation RNN 710 can take into account both past states as contextual information, as well as environmental contextual information to generate a prediction of future trajectories 401.

Figure 8:
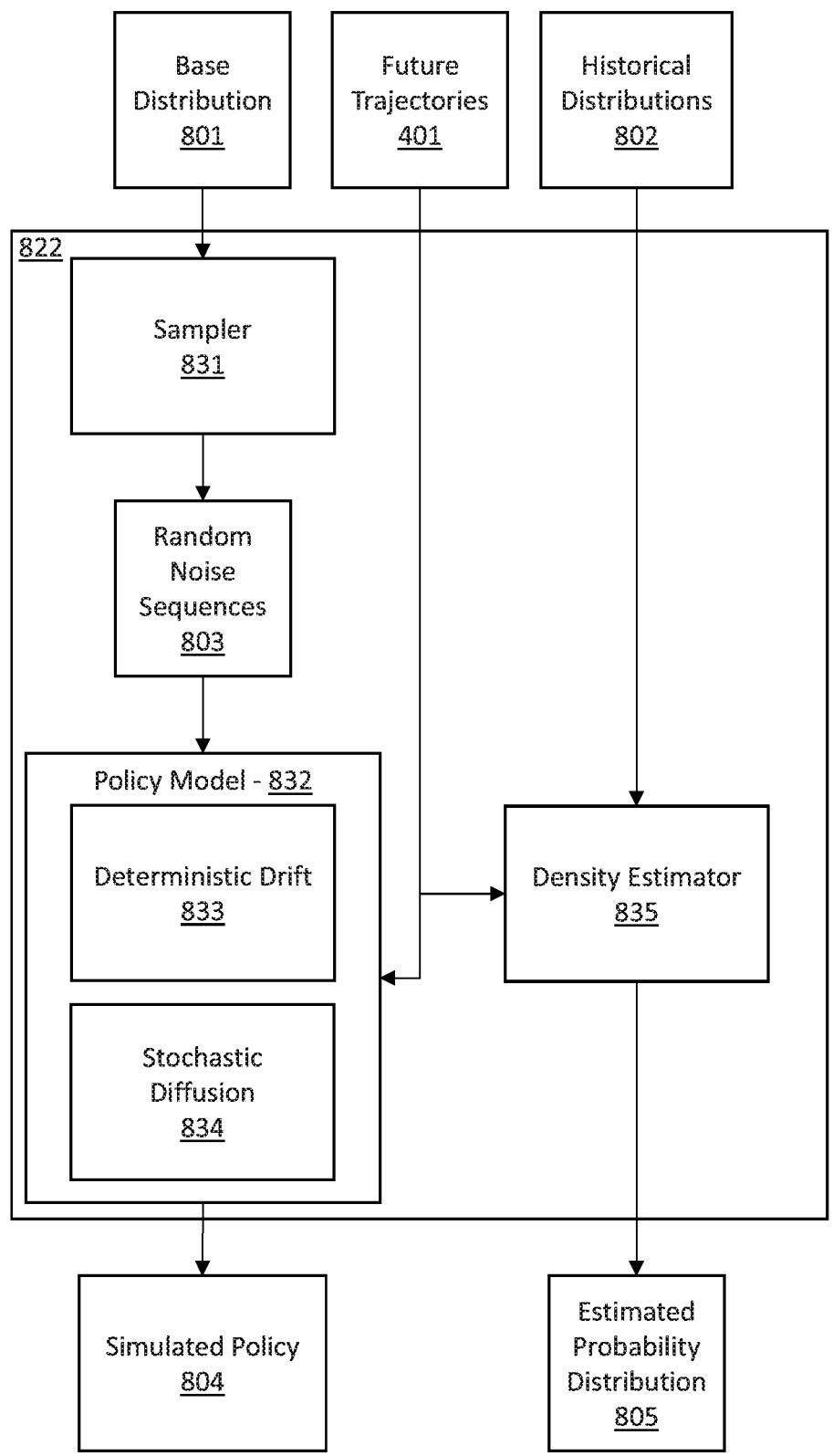
FIG. 8 is a block/flow diagram illustrating a system/method for reparameterizing a stochastic policy as a pushforward policy, in accordance with the present principles.

Referring now to FIG. 8, a block/flow diagram illustrating a system/method for reparameterizing a stochastic policy as a pushforward policy is depicted in accordance with the present principles.

According to an embodiment of the present invention, a policy can be simulated as a pushforward of a base distribution 801 using a policy simulator 822. In doing so, an evaluator and optimizer, such as the cross-entropy evaluator 420 described above, can more efficiently evaluate the density and precision of the probability density distribution in the future trajectories 401.

The policy simulator 822 can include components to model both the policy as well as the ground truth distribution. Thus, the policy simulator 822 includes a sampler 831 and a policy model 832 to simulate the policy and represent the simulated policy in a reparameterized form. The sampler 831 generates a set of random noise sequences 803 from a base distribution 801. The base distribution 801 can include, e.g., a Gaussian distribution stored in a memory device, or generated by a processing device of the policy simulator 822. Using the random noise sequences 803, the policy can be modeled as a pushforward of the distribution of noise sequences 803, thus transforming the noise sequences 803 into a distribution of future outcomes that model the future trajectories 401.

The policy model 832 can include a map from the random noise sequences 803 to the future trajectories 401, including, e.g., an autoregressive map. A function defining the map can be more easily and efficiently evaluated than the probability density distribution in the future trajectories 401. Therefore, according to one possible embodiment, the map can include, e.g., an autoregressive map representing the evolution of a controlled, discrete-time stochastic dynamical system with additive noise by parameterizing the map across deterministic drift 833 and stochastic diffusion 834. As such, the model can take the form of, e.g., equation 4 below:

$$x_t = \mu_t^\pi(x_1, \ldots, x_{t-1}, \phi) + \sigma_t^\pi(x_i, \ldots, x_{t-1}, \phi) z_t, \quad \text{Equation 4:}$$

where x is a predicted path, z is a noise sequence, t is time, π is the policy being modeled, μ represents deterministic drift and a represents stochastic diffusion.

Accordingly, the policy model 832 includes a deterministic drift 833 component, for example, e.g., stored in a memory device and executed by a processing device, as well as a stochastic diffusion 834 component, for example, e.g., stored in the same or a different memory device and executed by the same or a different processing device. Equation 4 is both invertible and differentiable, and thus, well suited for optimization and backpropagation via stochastic gradient descent. For example, the optimization problem of equation 3 can be rewritten to incorporate the model of equation 4 with substitutions as shown in equations 5 and 6, below:

$$(g_\pi^{-1}(x))_t = (\sigma_t^\pi(x_1, \ldots, x_{t-1}, \phi))^{-1}(z_t - \mu_t^\pi(x_1, \ldots, x_{t-1}, \phi)), \quad \text{Equation 5}$$

$$\log\left|(dg_\pi)_{g_\pi^{-1}(x|\phi)}\right| = \sum_t \log|\pi_t^\sigma(x_1, \ldots, x_{t-1})|. \quad \text{Equation 6}$$

Thus, the simulated policy $g_\pi$ can be efficiently computed via the chain rule of probability, thus simplifying the optimization of the policy.

However, the cross-entropy evaluation uses ground truth probability densities to determine error. The ground-truth probability densities may not be feasibly obtained. Instead, the policy simulator 822 can also model a ground-truth by generating an estimated probability distribution 805 from a set of historical distributions 802 using a density estimator 835. To reduce sample-induced variance in the training of the policy, the density estimator 835 can include a simple density estimator that has been independently trained using the historical distributions 802.

According to one possible embodiment, the density estimator 835 can include, e.g., a kernel density estimator. The kernel density estimator uses a Gaussian kernel which provides a penalty in place of the precision evaluation $H(q_\pi, \hat{p})$. For example, the penalty can be the mean square error between a set of samples from the historical distribution 802 and a set of samples from the future trajectories 401.

According to another possible embodiment, the density estimator 835 can include, e.g., a IID approximation that parameterizes the modeled distribution 3. In particular, the density estimator 835 discretizes the position of the vehicle being analyzed and then forms a categorical distribution of classes representing each of the possible future locations. The categorical distribution can then be trained via logistic regression, including a spatial cost function according to learned parameters.

Thus, the density estimator 835 produces the estimated probability distribution 805 that can be used by a cross-entropy evaluator in place of an actual ground-truth distribution. Similarly, the cross-entropy evaluator can use the policy simulation 804 as a proxy of the actual policy. As a result, the cross-entropy evaluator can more efficiently and accurately perform optimization using the policy simulation 804 and the estimated probability distribution 805.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for vehicle behavior prediction, the system comprising:
   an imaging device that captures images of a vehicle in traffic;
   a processing device including policy stored in a memory of the processing device in communication with the imaging device to stochastically model future behavior of the vehicle based on the captured images;
   a policy simulator in communication with the processing device that simulates the policy as a reparameterized pushforward policy of a base distribution;
   an evaluator that receives the simulated policy from the policy simulator and performs cross-entropy optimization on the future behavior of the vehicle by analyzing the simulated policy and updating the policy according to cross-entropy error, the optimization balancing precision and density evaluations for future trajectories by:

$$\min_\pi E_{\phi \sim \Phi} - E_{x \sim p(\cdot|\phi)} \log q_\pi(x|\phi) - \beta E_{x \sim q_\pi(\cdot|\phi)} \log p(x|\phi),$$

where E represents an expected value, $\phi$ represents a set of features of an environment, $\Phi$ represents a ground truth feature distribution, x represents a sample, $\beta$ represents a predefined coefficient, and p represents a ground truth distribution; and
   an alert system that retrieves the future behavior of the vehicle and recognizes hazardous trajectories of the future trajectories and generates an audible alert using a speaker.

2. The system as recited in claim 1, further including a density estimator that estimates a ground-truth probability for evaluating the future behavior.

3. The system as recited in claim 1, further including a policy model that simulates the policy as an autoregressive map of random noise sequences in terms of deterministic drift and stochastic diffusion.

4. The system as recited in claim 3, further including a sampler to sample the random noise sequences from a base distribution.

5. The system as recited in claim 4, wherein the base distribution is a Gaussian distribution.

6. The system as recited in claim 1, wherein the evaluator includes the cross-entropy optimization including comparing the future behavior to a probability distribution of an example distribution to determine error of density of a predicted probability distribution corresponding to the future behavior and precision of probabilities of the predicted probability distribution.

7. The system as recited in claim 1, wherein the policy is a linear generator.

8. The system as recited in claim 1, wherein the policy is a convolutional neural network.

9. The system as recited in claim 1, wherein the policy includes:
   an encoder convolutional neural network to generate an environmentally reasoned encoding;
   an encoder recurrent neural network in parallel with the encoder convolutional neural network to generate a historically reasoned encoding; and
   a decoder recurrent neural network to decode a combination of the environmentally reasoned encoding and the historically reasoned encoding.

10. The system as recited in claim 9, wherein each of the encoder recurrent neural network and the decoder recurrent neural network include gated recurrent units.

11. A system for vehicle behavior prediction, the system comprising:
   an imaging device that captures images of a vehicle in traffic;
   a processing device including policy stored in a memory of the processing device in communication with the imaging device to stochastically model future behavior of the vehicle based on the captured images;
   a policy simulator in communication with the processing device that simulates the policy as a reparameterized pushforward of a base distribution, including a policy model that simulates the policy as an autoregressive map of random noise sequences in terms of deterministic drift and stochastic diffusion;
   a density estimator that estimates a ground-truth probability for evaluating the future behavior;
   an evaluator in communication with the policy simulator and the density estimator that performs cross-entropy optimization on the future behavior of the vehicle by analyzing the simulated policy and the ground-truth probability according to density of a probability distribution and precision of predicted probabilities corresponding to the future behavior, and updating the policy according to cross-entropy error, the optimization balancing precision and density evaluations for future trajectories by:

$$\min_\pi E_{\phi \sim \Phi} - E_{x \sim p(\cdot|\phi)} \log q_\pi(x|\phi) - \beta E_{x \sim q_\pi(\cdot|\phi)} \log p(x|\phi),$$

where E represents an expected value, $\phi$ represents a set of features of an environment, $\Phi$ represents a ground truth feature distribution, x represents a sample, $\beta$ represents a predefined coefficient, and p represents a ground truth distribution; and
   an alert system that recognizes hazardous trajectories of the probable future trajectories and generates and audible alert using a speaker.

12. The system as recited in claim 11, further including a sampler to sample the random noise sequences from a base distribution.

13. The system as recited in claim 12, wherein the base distribution is a Gaussian distribution.

14. The system as recited in claim 11, wherein the evaluator includes the cross-entropy optimization including comparing the future behavior a probability distribution of an example distribution to determine error of density of a predicted probability distribution corresponding to the future behavior and precision of probabilities of the predicted probability distribution.

15. The system as recited in claim 11, wherein the policy includes:
   an encoder convolutional neural network to generate an environmentally reasoned encoding;

an encoder recurrent neural network in parallel with the encoder convolutional neural network to generate a historically reasoned encoding; and a decoder recurrent neural network to decode a combination of the environmentally reasoned encoding and the historically reasoned encoding.

16. The system as recited in claim 15, wherein each of the encoder recurrent neural network and the decoder recurrent neural network include gated recurrent units.

17. A method for vehicle behavior prediction, the method comprising:

capturing images of a vehicle in traffic an imaging device;

stochastically modelling future behavior of the vehicle with policy stored in a memory of a processing device based on the captured images;

simulating the policy as a reparameterized pushforward of a base distribution with a policy simulator;

performing cross-entropy optimization on the future behavior of the vehicle by analyzing the simulated policy and updating the policy according to cross-entropy error using an evaluator, the optimization balancing precision and density evaluations for future trajectories by:

$$\min_{\pi} E_{\phi \sim \Phi} - E_{x \sim p(\cdot|\phi)} \log q_{\pi}(x|\phi) - \beta E_{x \sim q_{\pi}(\cdot|\phi)} \log p(x|\phi),$$

where E represents an expected value, $\phi$ represents a set of features of an environment, $\Phi$ represents a ground truth feature distribution, x represents a sample, $\beta$ represents a predefined coefficient, and p represents a ground truth distribution; and recognizing hazardous trajectories of the probable future trajectories and generates and audible alert using a speaker with an alert system.

18. The system as recited in claim 17, further including estimating a ground-truth probability with a density estimator for evaluating the future behavior.

19. The system as recited in claim 17, further including simulating the policy as an autoregressive map of random noise sequences in terms of deterministic drift and stochastic diffusion using a policy model.

20. The system as recited in claim 17, wherein the cross-entropy optimization includes comparing the future behavior to a probability distribution of an example distribution to determine error of density of a predicted probability distribution corresponding to the future behavior and precision of probabilities of the predicted probability distribution.

* * * * *